(12) United States Patent
Seima et al.

(10) Patent No.: US 10,910,925 B2
(45) Date of Patent: Feb. 2, 2021

(54) CIRCUIT BOARD, MOTOR UNIT, AND FAN

(71) Applicant: MINEBEA MITSUMI Inc., Nagano (JP)

(72) Inventors: Toshiaki Seima, Yonago (JP); Takeshi Ohara, Fukuroi (JP); Koichi Tamai, Kakegawa (JP); Haruomi Morohashi, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 18 days.

(21) Appl. No.: 16/410,369

(22) Filed: May 13, 2019

(65) Prior Publication Data

US 2019/0363616 A1 Nov. 28, 2019

(30) Foreign Application Priority Data

May 23, 2018 (JP) .................. 2018-098499

(51) Int. Cl.
| | |
|---|---|
| *H02K 11/40* | (2016.01) |
| *H02K 11/215* | (2016.01) |
| *H02K 21/22* | (2006.01) |
| *H02K 9/06* | (2006.01) |
| *H02K 11/33* | (2016.01) |

(52) U.S. Cl.
CPC ............. *H02K 11/40* (2016.01); *H02K 9/06* (2013.01); *H02K 11/215* (2016.01); *H02K 11/33* (2016.01); *H02K 21/22* (2013.01); *H02K 2211/03* (2013.01)

(58) Field of Classification Search
CPC ....... H05K 2201/09354; H05K 1/0259; H05K 1/0215; H02K 21/22; H02K 11/40; H02K 11/33; H02K 11/215; H02K 11/21; H01L 27/0248; G11B 19/20; G11D 5/142; G11D 5/145
USPC ..................................... 310/DIG. 6
See application file for complete search history.

(56) References Cited

U.S. PATENT DOCUMENTS

| | | | | |
|---|---|---|---|---|
| 4,649,461 | A * | 3/1987 | Matsuta | H05K 3/4641 361/799 |
| 5,029,041 | A * | 7/1991 | Robinson | H01T 4/08 361/212 |
| 5,510,664 | A * | 4/1996 | Suzuki | H02K 7/04 310/179 |
| 7,812,488 | B2 * | 10/2010 | Cosco | H05K 1/0259 310/68 E |
| 9,698,656 | B2 * | 7/2017 | Yamada | H02K 11/0094 |
| 9,819,297 | B2 * | 11/2017 | Yamada | H05K 999/99 |

(Continued)

FOREIGN PATENT DOCUMENTS

| | | |
|---|---|---|
| JP | 2009-165209 A | 7/2009 |
| JP | 2016-058745 A | 4/2016 |

*Primary Examiner* — Burton S Mullins
(74) *Attorney, Agent, or Firm* — Pearne & Gordon LLP

(57) ABSTRACT

A circuit board for a motor unit equipped with a motor includes a substrate having a main surface being one of a pair of surfaces opposed to each other, and a back surface being another of the pair of surfaces, a magnetic detection element disposed in a predetermined region on an outer periphery side of the substrate on the main surface, and configured to output a detection signal in accordance with a position of a rotor of the motor, and a metal member formed between the outer periphery of the substrate and the magnetic detection element in the predetermined region on the main surface, and configured to receive a supplied ground voltage.

6 Claims, 8 Drawing Sheets

(56) References Cited

U.S. PATENT DOCUMENTS

| | | | |
|---|---|---|---|
| 2012/0152608 A1* | 6/2012 | Weigel | H05K 1/0218 |
| | | | 174/350 |
| 2015/0371984 A1 | 12/2015 | Kato et al. | |
| 2016/0315524 A1* | 10/2016 | Ozaki | H02K 11/40 |
| 2017/0303389 A1* | 10/2017 | Motohashi | H05K 1/0218 |
| 2017/0317069 A1 | 11/2017 | Kato et al. | |
| 2018/0153032 A1* | 5/2018 | Sasaki | H05K 5/0008 |
| 2018/0278130 A1* | 9/2018 | Kawamoto | H02K 11/40 |
| 2019/0242594 A1* | 8/2019 | Oya | H02K 11/35 |

\* cited by examiner

CIRCUIT BOARD, MOTOR UNIT, AND FAN

CROSS REFERENCE TO RELATED APPLICATIONS

This application claims the benefit of Japanese Patent Application No. 2018-098499, filed May 23, 2018, which is hereby incorporated by reference in its entirety.

BACKGROUND

Technical Field

The present disclosure relates to a circuit board, a motor unit, and a fan, and more particularly to a circuit board equipped with a motor drive control circuit for controlling driving of a motor, a motor unit including the circuit board and a motor, and a fan including the motor unit and an impeller.

Background

In a circuit board equipped with a motor drive control circuit for controlling driving of a motor, it is necessary to prevent malfunction of a circuit by static electricity or breakage of a circuit element by static electricity. As a general method for enhancing ESD (Electro-Static Discharge) strength in an electronic circuit, it is known to mount electronic components such as an ESD protection device on a circuit board (refer to Japanese Patent Application Laid-Open No. 2016-58745).

SUMMARY

However, in a circuit board mounted with a motor drive control circuit for an electronic apparatus equipped with a small motor, an area to mount the electronic component is small and a degree of freedom of wiring is low duo to restriction of a size and an outer shape of a bearing supporting an output shaft of the motor, or the like. Therefore it is not easy to mount the ESD protection device and the like.

For example, a small axial flow fan has a structure. In the structure, a second housing is disposed so as to cover a first housing in a state in which a circuit board mounted with a stator forming a motor, and a motor drive control circuit that controls driving of the motor is accommodated in the first housing disposed at a central portion of the axial flow fan, and a rotor forming the motor is accommodated in the cylindrical second housing formed integrally with an impeller.

In the axial flow fan having such a structure, the rotor is rotated by rotating force from the motor, so that the second housing formed integrally with the impeller rotates, and wind generates.

In the above circuit board of the axial flow fan, a magnetic detection element such as a hall element for detecting a magnetic flux of a magnet (permanent magnet) being one of components forming the rotor is mounted in order to specify a rotational position of the rotor.

The magnetic detection element needs to be disposed near the magnet in order to detect the magnetic flux of the magnet with high accuracy. An axial flow fan studied by inventors of this application has a structure in which a magnet is disposed along an inner wall of a second housing, and therefore a magnetic detection element needs to be disposed on an outer periphery side of a circuit board. Therefore, the magnetic detection element is likely to be touched by a hand of a human, and electrostatic breakdown is likely to occur.

In order to prevent the electrostatic breakdown of the magnetic detection element, as described above, it is effective that the ESD protection device is disposed. However, in order to dispose the ESD protection device on the circuit board, the circuit board needs to be enlarged, and an mount area needs to be enlarged. When the circuit board is enlarged, the size of a first housing for accommodating the circuit board is enlarged, and a ratio of the first housing occupying a whole of the axial flow fan is increased. In the axial flow fan, the larger the first housing becomes, the narrower a region (space) for allowing wind generated by rotation of an impeller to flow becomes, and therefore a sufficient air flow for implementing required cooling performance may not be obtained.

Thus, in the circuit board mounted with the motor drive control circuit for a small motor, it is not easy to dispose the ESD protection device due to various restrictions. Particularly, in a case of a motor drive control circuit for a small motor for automotive application, a level of required ESD strength is high, and therefore there is a possibility that the size of the necessary ESD protection device is enlarged, and it is extremely difficult to mount such a large ESD protection device on the circuit board without increasing the area of the circuit board.

The present disclosure is related to improving ESD strength of a motor drive control circuit while suppressing increase of an area of a circuit board in the light of above mentioned issues.

According to an exemplary embodiment of the present disclosure, a circuit board for a motor unit equipped with a motor includes: a substrate having a main surface being one of a pair of surfaces opposed to each other, and a back surface being another of the pair of surfaces; a magnetic detection element disposed in a predetermined region on an outer periphery side of the substrate on the main surface, and configured to output a detection signal in accordance with a position of a rotor of the motor; and a metal member formed between the outer periphery of the substrate and the magnetic detection element in the predetermined region on the main surface, and configured to receive a supplied ground voltage.

According to the circuit board of the present disclosure, it is possible to improve ESD strength of a motor drive control circuit while suppressing increase of an area of a circuit board.

DETAILED DESCRIPTION

1. Summary of Embodiment

Figure 1:
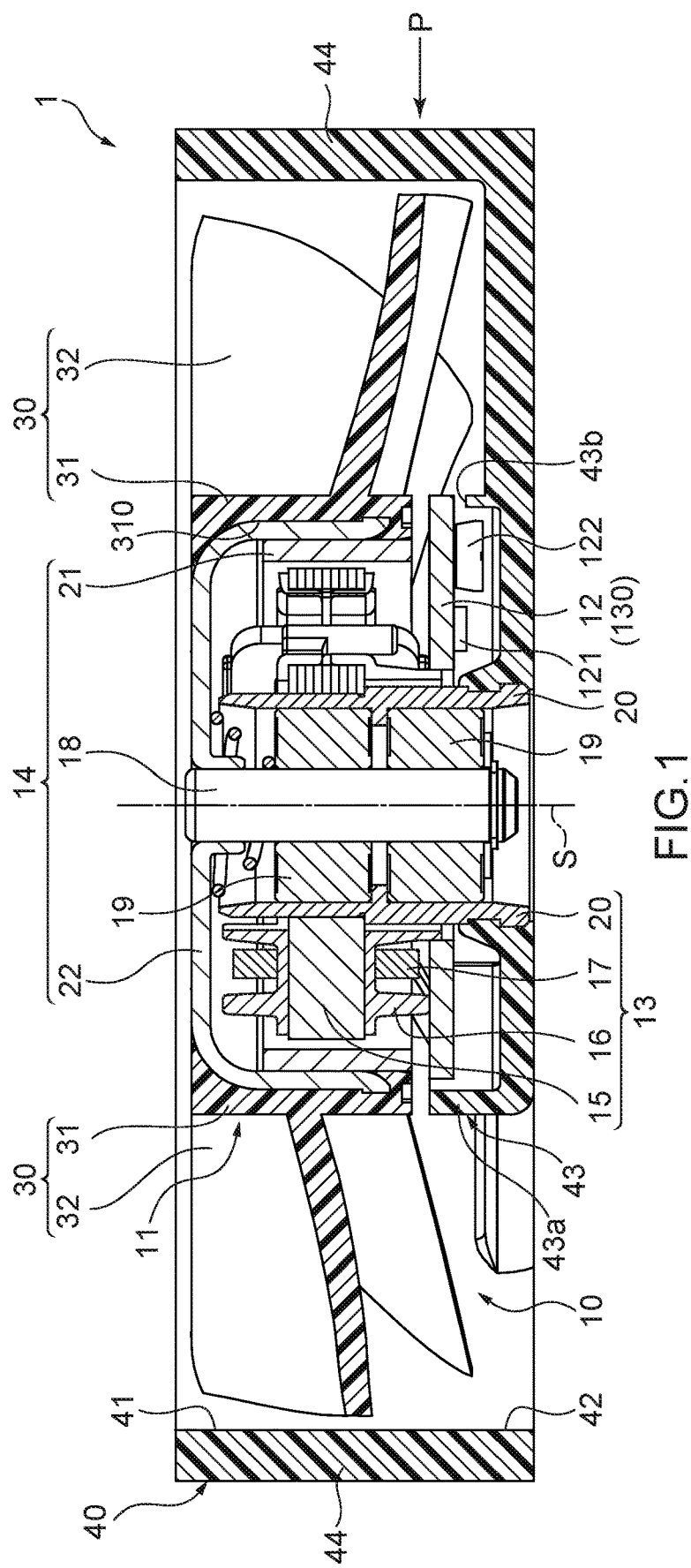
FIG. 1 is a diagram illustrating a configuration of a fan according to Embodiment 1.

First, a summary of an exemplary embodiment of the disclosure disclosed in this application will be described. In the following description, as an example, reference numerals on the drawings corresponding to components of the disclosure are mentioned between parentheses.

[1] A circuit board (12, 12A) for a motor unit (10) equipped with a motor (11), according to an exemplary embodiment of the present disclosure having: a substrate (130) having a main surface (131) being one of a pair of surfaces opposed to each other, and a back surface (132) being another of the pair of surfaces; a magnetic detection element (122) disposed in a predetermined region (AR) on an outer periphery side of the substrate on the main surface, and configured to output a detection signal in accordance with a position of a rotor (14) of the motor; and a metal member (141, 144) formed between the outer periphery of the substrate and the magnetic detection element in the predetermined region on the main surface, and configured to receive a supplied ground voltage.

[2] In the above circuit board (12), the metal member may include a first wiring pattern (141) made of metal formed along the outer periphery (136, 135a) of the substrate in the predetermined region on the main surface.

[3] In the above circuit board, no insulating film may be formed on a surface of the first wiring pattern.

[4] The above circuit board may further has: a second wiring pattern (142) configured to receive the supplied ground voltage, and made of metal formed on the back surface; and at least one via (143, 143_1, 143_2) penetrating the main surface and the back surface, and connecting the first wiring pattern and the second wiring pattern.

[5] The above circuit board (12) may further has a ground pattern (137) configured to receive the supplied ground voltage, and made of metal formed on the main surface, wherein the first wiring pattern may be belt-like, one end portion (141a) of the first wiring pattern may be connected to the ground pattern, and at least the one via may be formed on another end portion (141b) side of the first wiring pattern.

[6] The above circuit board (12A) may further has: a ground pattern (142A) configured to receive the supplied ground voltage, and made of metal formed on the back surface, wherein the metal member may be a through hole part (144) including a metal film (146) formed on an inner wall surface of the substrate defined by a through hole (145) penetrating the main surface and the back surface, and the metal film may be connected to the ground pattern.

[7] In the above circuit board, a plurality of the through hole parts may be included, and a plurality of the through hole parts may be arranged side by side along the outer periphery (135a, 136) of the substrate in the predetermined region.

[8] In the above circuit board, the metal film may extend from the inner wall surface of the substrate defined by the through hole onto the main surface.

[9] In the above circuit board, the substrate may have a main part (134), and a projecting part (135) projecting outward from the main part, the predetermined region may be a region including the projecting part on the main surface, and the metal member may be disposed along an outer periphery (135a) of the projecting part.

[10] A motor unit (10) according to an exemplary embodiment of the present disclosure having: the above circuit board (12, 12A); the motor (11); and an accommodating part (43) having a cylindrical side wall part (43a) for accommodating the substrate, wherein an outer periphery of the main part of the substrate is surrounded by the side wall part (43a), and at least a part of the outer periphery of the projecting part of the substrate is not surrounded by the side wall part.

[11] A fan (1) according to an exemplary embodiment of the present disclosure having: the above motor unit (10); and an impeller (30) configured to be rotatable by rotating force of the motor.

2. Specific Examples of Embodiments

Hereinafter, specific examples of embodiments of the present disclosure will be described with reference to the accompanying drawings. In the following description, common components in each embodiment are denoted by the same reference numerals, and repeated description is omitted. It is necessary to note that the drawings are schematic, and a relation of a size of each component, a ratio of each component, and the like are sometimes different from actual relation, ratio, and the like. Different portions of relations or ratios of mutual sizes may be included between mutual drawings.

Embodiment 1

FIG. 1 is a diagram illustrating a configuration of a fan according to Embodiment 1. In this figure, a sectional shape of a fan 1 according to Embodiment 1 is illustrated.

The fan 1 is an apparatus that generates wind by rotating an impeller. The fan 1 is, for example, an axial flow fan. The fan 1 can be used as one of cooling apparatuses configured to discharge heat generated in the apparatuses to cool inside of the cooling apparatuses, for example.

As illustrated in FIG. 1, the fan 1 includes a motor unit 10, an impeller 30, and a case 40. The case 40 is a housing accommodating the motor unit 10, and is formed of, for example, resin.

The case 40 has an accommodating part 43 and an outer wall part 44. The accommodating part 43 is formed in, for example, a bottomed cylindrical shape. Specifically, the accommodating part 43 has a cylindrical side wall part 43a, and accommodates a circuit board 12 inside the side wall part 43a as described below. The accommodating part 43 is disposed at a central portion of the case 40.

The outer wall part 44 is connected to the accommodating part 43, is disposed coaxially with the side wall part 43a of the accommodating part 43, and has a cylindrical shape having a larger diameter than the side wall part 43a of the accommodating part 43. For example, the outer wall part 44 and the accommodating part 43 are integrally formed.

As illustrated in FIG. 1, the impeller 30 is disposed inside the outer wall part 44. The outer wall part 44 functions as a guard part for protecting the impeller 30. Openings 41, 42 for allowing wind generated by rotation of the impeller 30 to pass are formed between the accommodating part 43 and the outer wall part 44.

The impeller 30 is a component for generating wind by rotating. The impeller 30 is formed to be rotatable by rotating force of a motor 11. Specifically, the impeller 30 has an accommodating part 31, and blade parts 32. The accommodating part 31 is a cylindrically formed housing, and accommodates a rotor 14 described below. The blade parts 32 are function parts for generating wind, and are formed so as to project radially from an outer peripheral surface of the accommodating part 31.

The motor unit 10 includes the motor 11 configured to generate rotating force for rotating the impeller 30, and the circuit board 12 formed with a motor drive control circuit for controlling driving of the motor 11.

The motor 11 is, for example, a single-phase brushless DC motor. The motor 11 includes a stator 13 and the rotor 14. The stator 13 includes a stator core 15, an insulator 16, a coil 17, and a bearing housing 20. The rotor 14 includes an output shaft (shaft) 18, a magnet (permanent magnet) 21, and a rotor yoke 22. The output shaft 18 is connected to the accommodating part 31 of the impeller 30.

The rotor 14 is accommodated in the accommodating part 31 of the impeller 30. Specifically, as illustrated in FIG. 1, the output shaft 18 is disposed at a central portion of the cylindrical accommodating part 31 so as to be supported by a bearing 19, and the bearing 19 is covered with the bearing housing 20. Additionally, for example, a ring-shaped magnet 21 is disposed on an inner wall surface 310 side of the cylindrical accommodating part 31, and the rotor yoke 22 is disposed between the magnet 21 and the inner wall surface 310 of the accommodating part 31.

A plurality of electronic components such as a magnetic detection element 122, and an IC (Integrated Circuit) 121 for motor drive control are mounted on the circuit board 12, and connected to each other by wires, so that the motor drive control circuit is implemented.

The magnetic detection element 122 is a component for detecting a position of the rotor 14 of the motor 11, and is, for example, a hall element, a Hall IC, or the like. The magnetic detection element 122 detects the position of the rotor 14 of the motor 11, and generates a detection signal in accordance with the detected position of the rotor 14 to output the detection signal.

The IC 121 for motor drive control is a semiconductor integrated circuit configured to supply a signal generated on the basis of the detection signal output from the magnetic detection element 122 to the coil 17 to drive the motor 11, and generate a periodic signal (for example, FG signal) in accordance with the rotational speed of the motor 11.

The motor drive control circuit supplies a current to the coil 17, and the direction of the current is periodically switched, so that the rotor 14 rotates. Consequently, the impeller 30 connected to the output shaft 18 of the rotor 14 can rotate to generate wind.

As described above, various electronic components are mounted on the circuit board 12, so that the motor drive control circuit is implemented. The circuit board 12 includes various components for enhancing ESD strength of the motor drive control circuit. Hereinafter, the circuit board 12 will be described in detail.

Figure 2A:
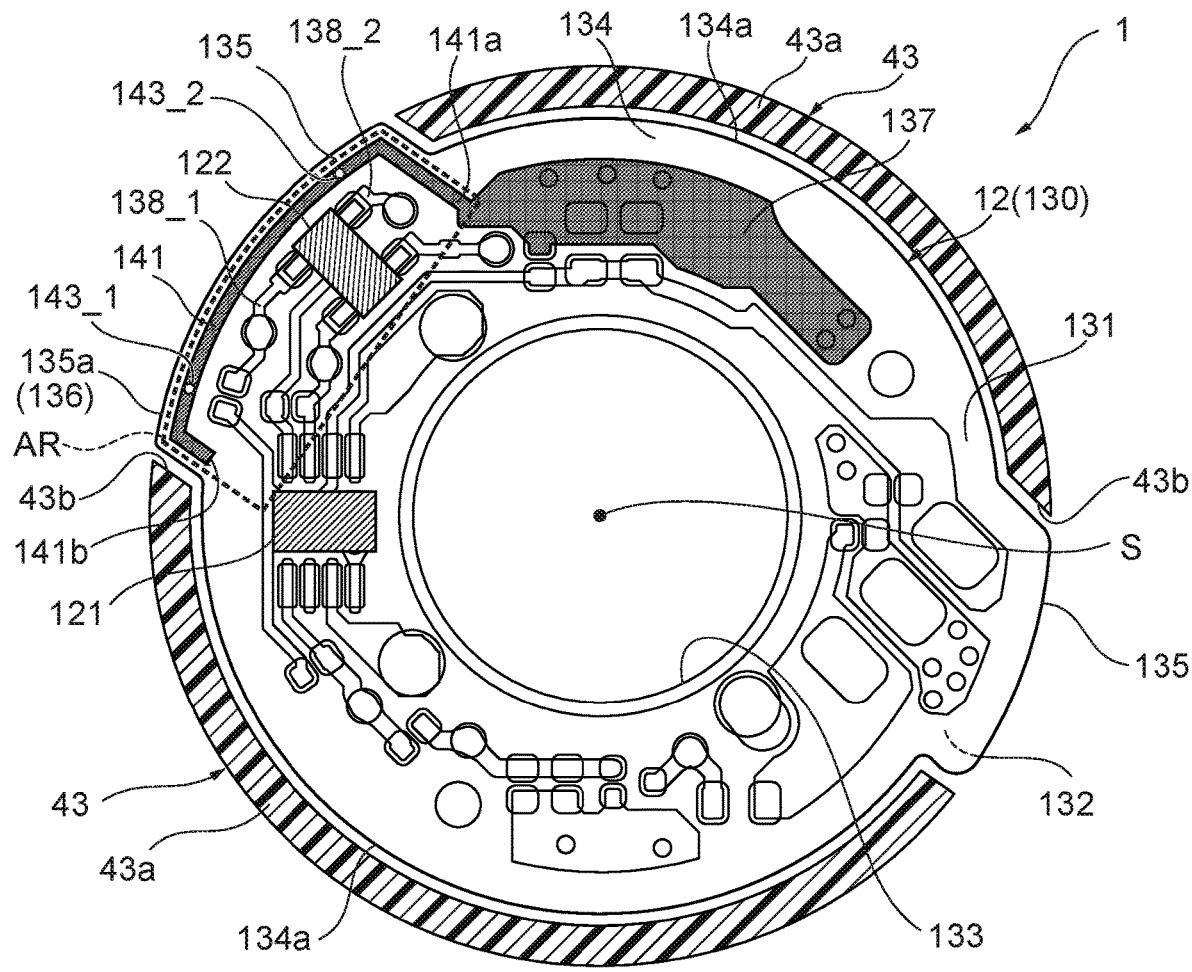
FIG. 2A is a plan view of a main surface side of a circuit board according to Embodiment 1.
Figure 2B:
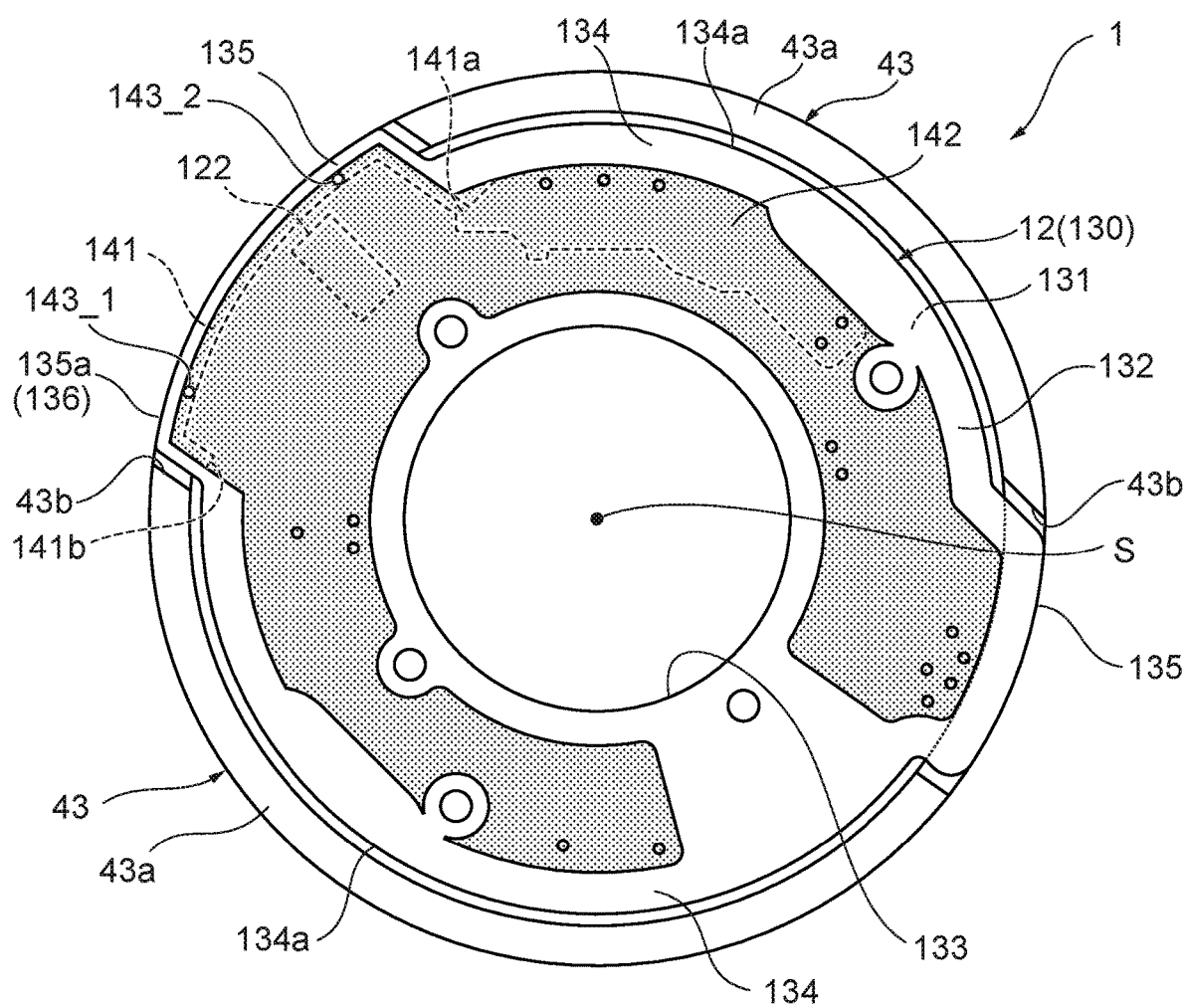
FIG. 2B is a plan view of a back surface side of the circuit board according to Embodiment 1.

FIGS. 2A, 2B each are a diagram illustrating a configuration of the circuit board 12 according to Embodiment 1.

In FIG. 2A, a plan view of a main surface 131 side of the circuit board 12 (substrate 130) is illustrated, and in FIG. 2B, a plan view of a back surface 132 side of the circuit board 12 (substrate 130) is illustrated.

The circuit board 12 illustrated in FIGS. 2A, 2B includes the substrate 130, and various electronic components mounted on the substrate 130. The circuit board 12 is a mount board (Printed Circuit Board) that implements a motor drive control circuit by mounting the electronic components such as the IC for motor drive control and the magnetic detection element 122 on the substrate 130, and connecting the respective electronic components to each other by wiring patterns formed on the substrate 130.

The substrate 130 is, for example, a printed wiring board (PWB: Printed Wired Board) obtained by forming a plurality of wiring patterns formed of metal thin film (for example, copper foil). As illustrated in FIGS. 2A, 2B, the substrate 130 has the main surface 131 being one of a pair of surface opposed to each other, and the back surface 132 being another of the pair of surfaces. The substrate 130 is, for example, a two-layered substrate (double-sided substrate) using the main surface 131 as a first wiring layer, and using the back surface 132 as second wiring layer.

The substrate 130 is formed annularly (in a ring shape) in plan view. Specifically, a circular through-bore 133 penetrating the main surface 131 and the back surface 132 is formed at a central portion of the substrate 130 having a circular outer shape in plan view. The through-bore 133 is a hole for installing a part of the motor 11. Specifically, as illustrated in FIG. 1, in a case in which the fan 1 (motor unit 10) as a product is assembled, the output shaft 18 of the motor 11, the bearing 19, and the bearing housing 20 are disposed in the through-bore 133 of the substrate 130.

In FIGS. 2A, 2B, an axis of the output shaft 18 in a case in which the fan 1 is assembled is denoted by reference numeral "S".

The substrate 130 has a main part 134, and projecting parts 135 projecting outward from the main part 134. In the main part 134, a large number of electronic components (such as the IC 121 for motor drive control) forming the motor drive control circuit, and the wiring patterns are disposed. In the projecting parts 135, as described below, some of the electronic components forming the motor drive control circuit such as the magnetic detection element 122 are disposed.

As illustrated in FIGS. 2A, 2B, the substrate 130 is accommodated in the accommodating part 43 of the case 40.

Specifically, the substrate 130 is disposed in the accommodating part 43 in a state. In the state, the main part 134 is covered with the accommodating part 43, and the projecting parts 135 of the substrate 130 are exposed from the accommodating part 43.

Figure 3:
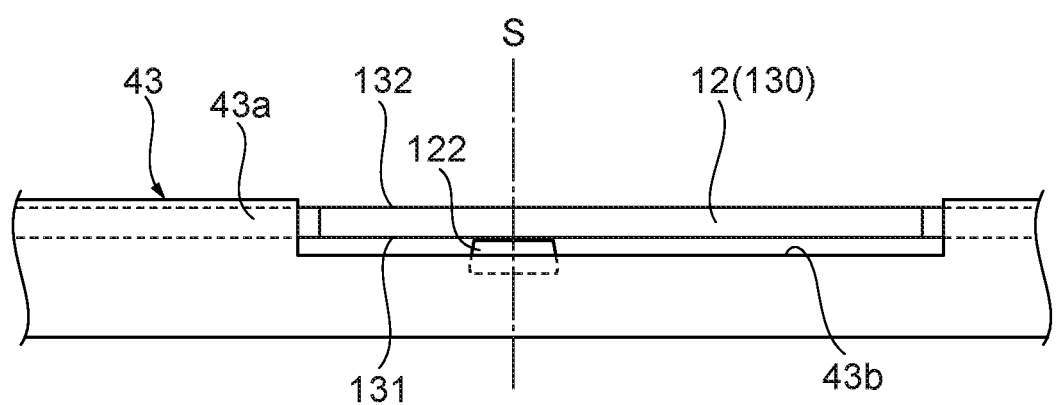
FIG. 3 is a diagram schematically illustrating a substrate accommodated in an accommodating part in the circuit board according to Embodiment 1.

FIG. 3 is a diagram schematically illustrating the substrate 130 accommodated in the accommodating part 43. In this figure, a positional relation between the accommodating part 43 and the substrate 130 as viewed from the direction P perpendicular to the axis S in FIG. 1 is illustrated.

As illustrated in FIG. 3, the main part 134 of the substrate 130 is disposed in the accommodating part 43. On the other hand, the projecting parts 135 of the substrate 130 are disposed in a recessed part 43b formed so as to be recessed in the direction parallel to the axis S in the side wall part 43a of the accommodating part 43.

Consequently, an outer periphery 134a of the main part 134 of the substrate 130 is disposed so as to be surrounded by the side wall part 43a of the accommodating part 43, and at least one parts of the outer peripheries 135a of the projecting parts 135 of the substrate 130 are not surrounded by the side wall part 43a of the accommodating part 43 and exposed to outside of the accommodating part 43.

The magnetic detection element 122 is disposed in a region overlapping on the magnet 21 (for example, directly under the magnet 21) as viewed from the axis S direction of the output shaft 18 as illustrated in FIG. 1, in order to efficiently detect a magnetic flux of the magnet 21 of the rotor 14. More specifically, as illustrated in FIG. 2A, the magnetic detection element 122 is disposed in a predetermined region AR on an outer periphery 136 side of the substrate 130 on the main surface 131 of the substrate 130.

Herein, the predetermined region AR is a region including the projecting part 135 on the main surface 131 as illustrated in FIG. 2A, for example. In FIG. 2A, as an example, a case in which the two projecting parts 135 are provided in the substrate 130, and one of the projecting part 135 is included in the predetermined region AR is illustrated.

In the projecting part 135, all the magnetic detection element 122 may be disposed, or a part of the magnetic detection element 122 may be disposed. In FIG. 2A, as an example, a case in which the magnetic detection element 122 is disposed from the projecting part 135 to the main part 134 is illustrated.

The electronic components other than the magnetic detection element 122 and main wiring patterns are disposed in the main part 134. For example, in the main part 134 of the main surface 131, the IC 121 for motor drive control is disposed, and a wiring pattern (hereinafter, referred to as a "ground pattern") 137 for receiving a supplied ground voltage is formed.

In the substrate 130, a metal member 141 for ESD protection of the motor drive control circuit is provided. The metal member 141 is formed between the outer periphery 136 of the substrate 130 and the magnetic detection element 122 in the predetermined region AR on the main surface 131, and is connected to the ground pattern 137.

For example, as illustrated in FIG. 2A, the metal member 141 is a first wiring pattern made of metal formed along the outer periphery of the substrate 130 in the predetermined region AR on the main surface 131. Hereinafter, the metal member 141 is also referred to as a "guard pattern 141". In FIG. 2A, in order to facilitate understanding, the guard pattern 141 and the ground pattern 137 are hatched.

The guard pattern 141 is formed in, for example, a belt-like shape. That is, the guard pattern 141 is formed of a belt-like metal thin film formed on the main surface 131 along a part of the outer periphery 136 of the substrate 130. One end portion 141a of the guard pattern 141 is connected to the ground pattern 137. Consequently, a ground voltage is supplied to the guard pattern 141 through the ground pattern 137.

Herein, it is preferable that the guard pattern 141 be formed in the predetermined region AR on the main surface 131 so as to surround at least the magnetic detection element 122 from outside. More preferably, for example, as illustrated in FIG. 2A, the guard pattern 141 is formed in the predetermined region AR on the main surface 131 so as to surround, from outside, the magnetic detection element 122, and wiring patterns 138_1, 138_2, and the like connected to the magnetic detection element 122.

It is preferable that no insulating film be formed on a surface of the guard pattern 141. For example, in a manufacturing process of a printed wiring board as the circuit board 12, solder resist for protecting the substrate surface is not coated on the guard pattern 141. Consequently, it is possible to reduce an insulation resistance value of the guard pattern 141 to static electricity.

As illustrated in FIG. 2B, as a second wiring pattern, a wiring pattern 142 made of metal is formed on the back surface 132 of the substrate 130. The ground voltage is supplied to the wiring pattern 42. The wiring pattern 142 is, for example, a solid pattern. Hereinafter, the wiring pattern 142 is referred to as a "ground pattern 142". In FIG. 2B, in order to facilitate understanding, the ground pattern 142 is hatched.

The ground pattern 142 and the guard pattern 141 may be connected by at least one via 143 penetrating the main surface 131 and the back surface 132. In FIG. 2A and FIG. 2B, a case in which two vias 143_1, 143_2 are formed in the substrate 130 is illustrated, as an example.

At least one of the vias 143 may be formed on another end portion 141b side of the guard pattern 141. For example, as illustrated in FIG. 2A and FIG. 2B, the via 143_1 of the two vias 143_1, 143_2 is formed on the one end portion 141a side connected to the ground pattern 137 of the guard pattern 141, and the via 143_2 may be formed on the other end portion 141b opposite to the end portion 141a connected to the ground pattern 137 of the guard pattern 141.

According to the circuit board 12 having the above configuration, the following effects are exhibited.

Figure 4:
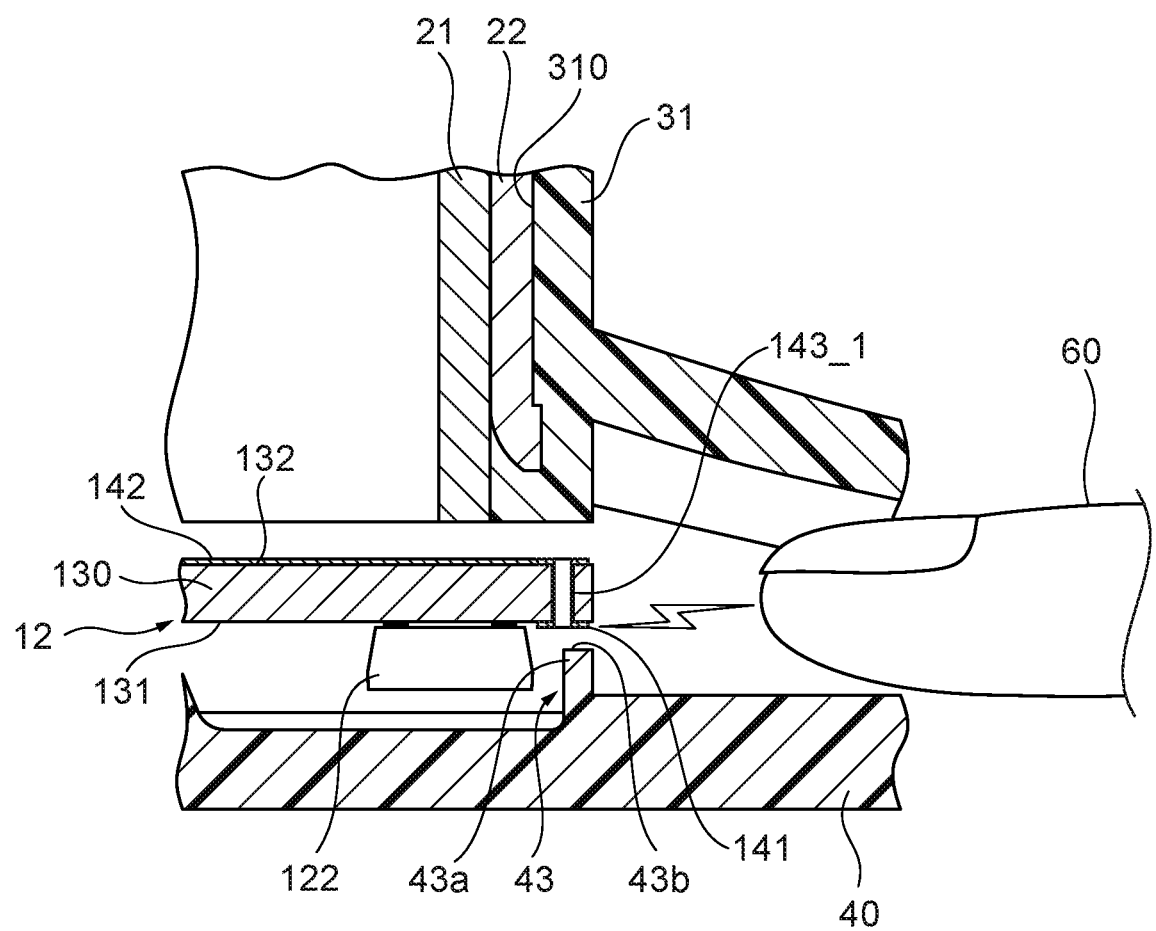
FIG. 4 is an enlarged view of a peripheral portion of a magnetic detection element in FIG. 1.

FIG. 4 is an enlarged view of a peripheral portion of the magnetic detection element 122 in FIG. 1.

In the fan 1 according to Embodiment 1, as illustrated in FIG. 2A and FIG. 2B, the main part of the substrate 130 is formed as small as possible, and is disposed in the accommodating part 43 of the case 40, the magnetic detection element 122 is disposed on the projecting part 135 formed so as to project from the main part of the substrate 130, and the projecting part 135 is exposed to the outside of the accommodating part 43.

According to this configuration, the magnetic flux of the magnet 21 can be precisely detected by the magnetic detection element 122 while the mount area of the substrate 130 is minimized, and a dust-proofing effect can be expected by covering the part (main part 134) other than the projecting part 135 of the substrate 130 with the side wall part 43a of the accommodating part 43.

The main part 134 mounted with a large number of the electronic components such as the IC 121 for motor drive control is surrounded by the side wall part 43a of the accommodating part 43, and therefore a charged body such as a hand of a human is unlikely to contact, and electrostatic breakdown of the electronic component is unlikely to occur.

On the other hand, as illustrated in FIG. 4, the projecting part 135 mounted with the magnetic detection element 122 of the substrate 130 is not surrounded by the side wall part 43a of the accommodating part 43, and is exposed from the accommodating part 43, and therefore a charged body 60 such as a hand of a human is likely to contact. Therefore, electrostatic breakdown of the magnetic detection element 122 disposed on the projecting part 135 is likely to occur, and causes lowering of the ESD strength of the motor drive control circuit.

Therefore, in the circuit board 12 according to Embodiment 1, the magnetic detection element 122 is disposed in the predetermined region AR on the outer periphery 136 side on the main surface 131 of the substrate 130, and the guard pattern 141 as a metal member to which the ground voltage is supplied is disposed along the outer periphery 136 of the substrate 130 between the outer periphery 136 of the substrate 130 and the magnetic detection element 122 in the predetermined region AR.

According to this, as illustrated in FIG. 4, even in a case in which the charged body 60 such as a hand of a human approaches the projecting part 135 of the substrate 130 (predetermined region AR), or even in a case in which the charged body 60 contacts the projecting part 135, discharge occurs between the charged body 60 and the guard pattern 141 having lower impedance (resistance value) than the magnetic detection element 122, and therefore it is possible to prevent the electrostatic breakdown of the electronic component disposed on the projecting part 135 (predetermined region AR) such as the magnetic detection element 122.

Thus, according to the circuit board 12 according to Embodiment 1, it is possible to improve the ESD strength of the motor drive control circuit without separately providing the electronic components such as the ESD protection device. That is, according to the circuit board 12, it is possible to improve the ESD strength of the motor drive control circuit while suppressing increase of the area of the circuit board.

An insulation resistance value of the guard pattern 141 to static electricity can be further reduced by not forming any insulating film on the surface of the guard pattern 141, and therefore it is possible to further improve the ESD strength of the motor drive control circuit.

In the circuit board 12 according to Embodiment 1, the ground pattern 142 is formed as the second wiring pattern on back surface 132 of the substrate 130, and the guard pattern 141 and the ground pattern 142 are connected by at least the one via 143, so that the resistance value of the guard pattern 141 can be further reduced. Consequently, it is possible to further improve the ESD strength of the motor drive control circuit.

The guard pattern 141 is composed of a belt-like wiring pattern, the one end portion 141a of the guard pattern 141 is connected to the ground pattern 137, and at least the one via 143 is formed on the other end portion 141b side of the guard pattern 141.

Consequently, the other end portion 141b side of the guard pattern 141 is connected to the ground pattern 142 on the back surface 132 through the via 143, and therefore, for example, even in a case in which a crack occurs on the substrate 130 at the time of working of the outer shape of the substrate 130, and the guard pattern 141 is disconnected, the ESD protection function of the other end portion 141b side of the guard pattern 141 can be prevented from being lost.

Embodiment 2

Figure 5A:
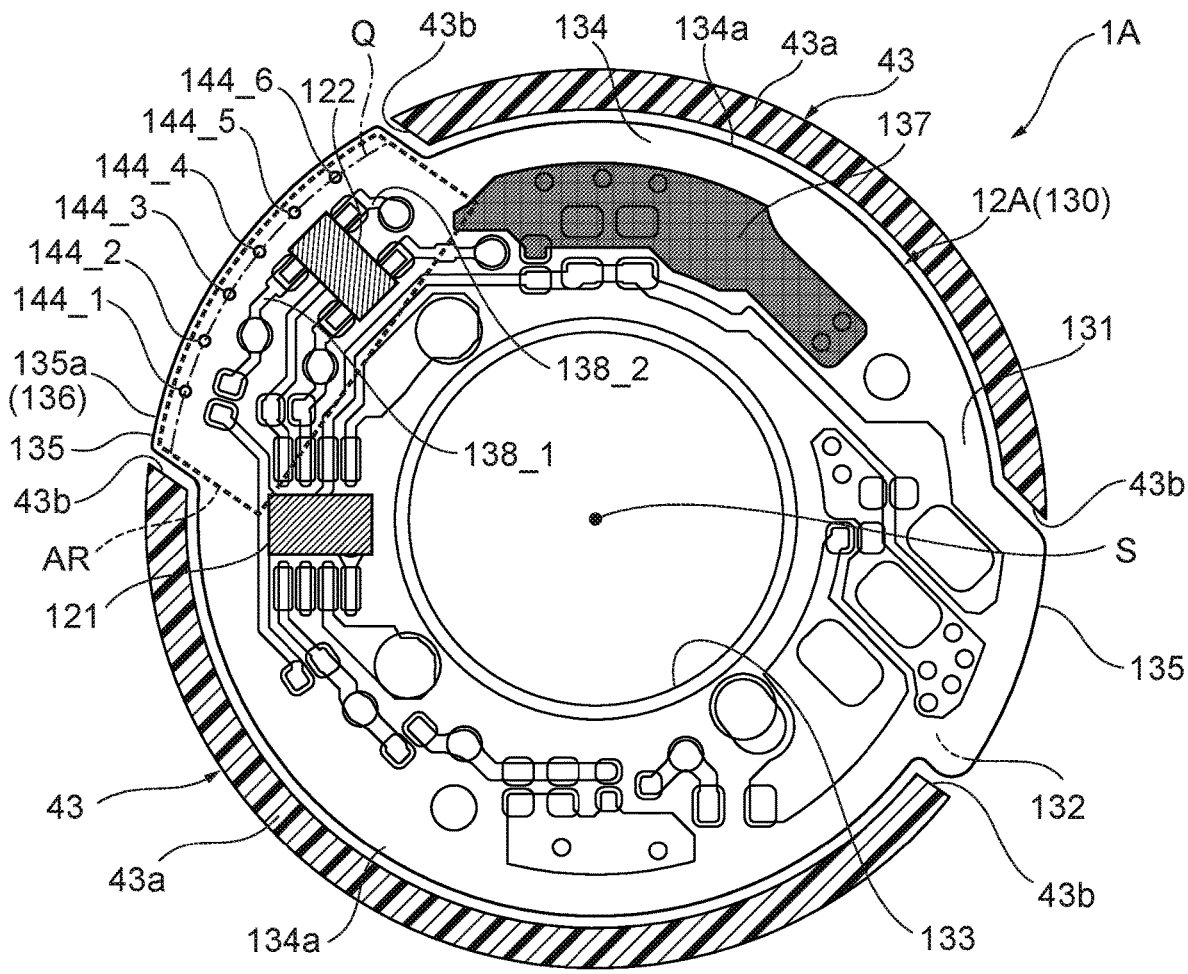
FIG. 5A is a plan view of a main surface side of a circuit board according to Embodiment 2.
Figure 5B:
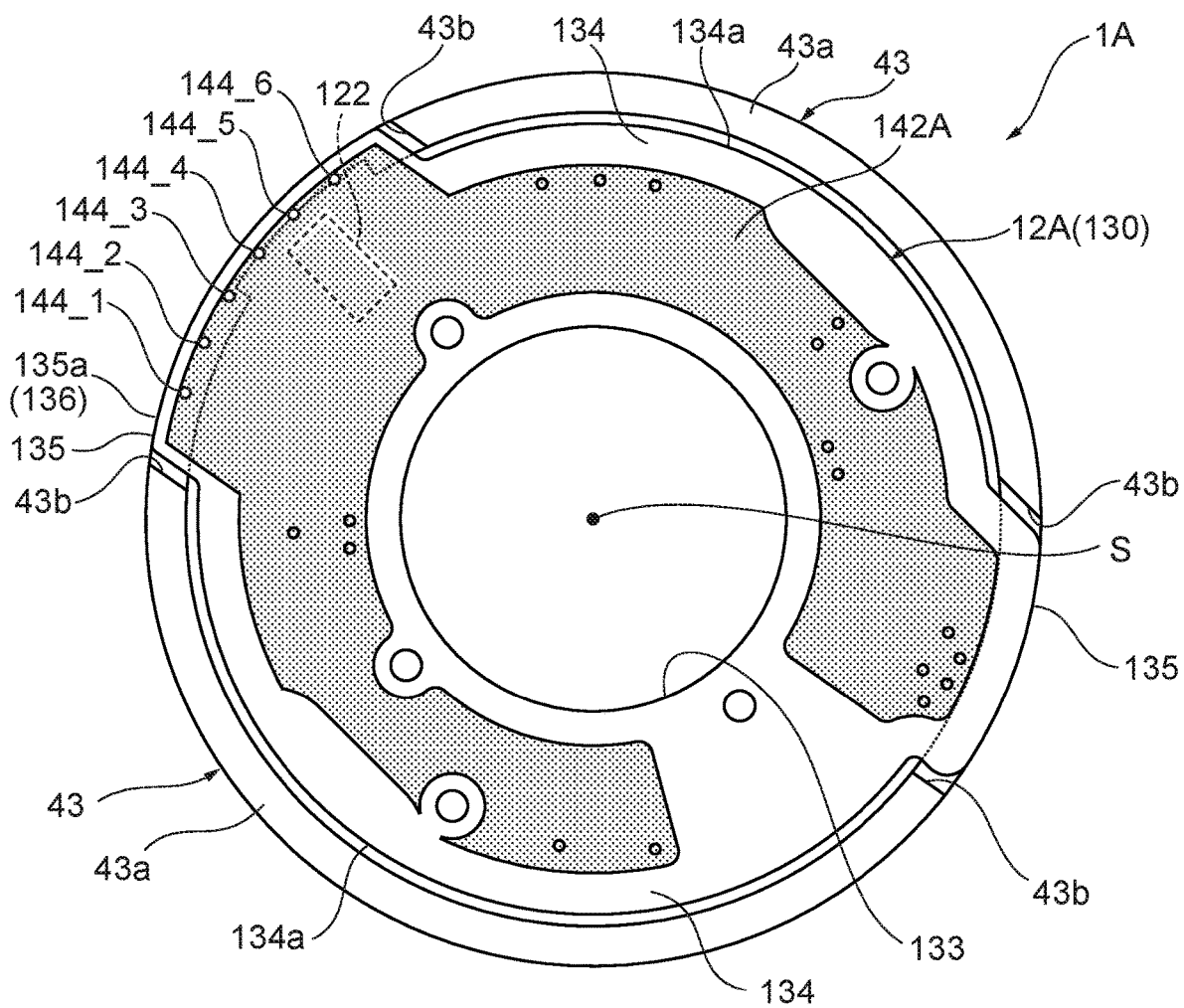
FIG. 5B is a plan view of a back surface side of the circuit board according to Embodiment 2.

FIGS. 5A, 5B each are a diagram illustrating a configuration of a circuit board 12A according to Embodiment 2.

In FIG. 5A, a plan view of a main surface 131 side of the circuit board 12A (substrate 130) is illustrated, and in FIG. 5B, a plan view of a back surface 132 side of the circuit board 12A (substrate 130) is illustrated.

The circuit board 12A according to Embodiment 2 is different from the circuit board 12 according to Embodiment 1 in that the circuit board has through hole parts 144 as a metal member for ESD protection of a motor drive control circuit in place of the guard pattern 141, and is similar to the circuit board 12 according to Embodiment 1 in other points.

Specifically, as illustrated in FIGS. 5A, 5B, the circuit board 12A has a ground pattern 142A formed on the back surface 132 of the substrate 130, and at least the one through hole parts 144 formed in a predetermined region AR including a projecting part 135 of the substrate 130, and connected to the ground pattern 142A.

In FIGS. 5A, 5B, a case in which six through hole parts 144_1 to 144_6 are formed is illustrated. However, the number of the through hole parts 144 formed in the substrate 130 is not restricted. Additionally, in FIG. 5B, the ground pattern 142A is hatched for facilitating understanding.

The ground pattern 142A is, for example, a solid pattern. As illustrated in FIGS. 5A, 5B, for example, the ground pattern 142A is formed on the back surface 132 of the substrate 130 so as to overlap on at least part of the predetermined region AR as viewed from the axis S direction.

Figure 6:
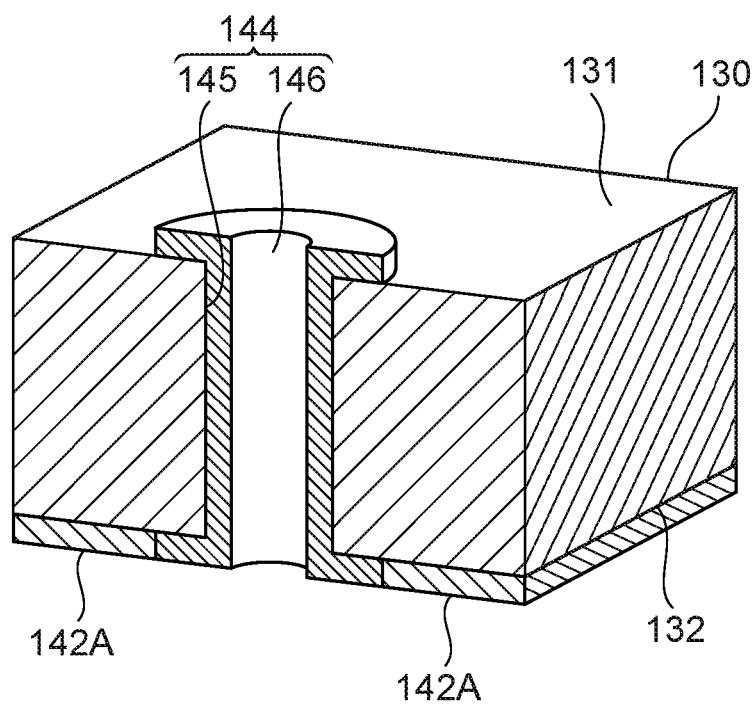
FIG. 6 is a diagram schematically illustrating a configuration of a through hole part in the circuit board according to Embodiment 2.

FIG. 6 is a diagram schematically illustrating a configuration of through hole parts 144. In this figure, a sectional structure of a region in which the through hole parts 144 of the substrate 130 are formed.

As illustrated in FIG. 6, each through hole part 144 includes a through hole 145 penetrating the main surface 131 and the back surface 132 of the substrate 130, and a metal film 146 formed on an inner wall surface of the substrate 130 defined by the through hole 145. The metal film 146 is formed by a metal material similar to various wiring patterns formed on the substrate 130, for example.

The metal film 146 is connected to the ground pattern 142A on the back surface 132 side of the through hole 145. Specifically, the metal film 146 extends from the inner wall surface of the substrate 130 defined by the through hole 145 onto the back surface 132, and is connected to the ground pattern 142A.

The metal film 146 extends from the inner wall surface of the substrate 130 defined by the through hole 145 onto the main surface 131. Consequently, as illustrated in FIG. 6, the metal film 146 is exposed on the main surface 131.

As illustrated in FIGS. 5A, 5B, the through hole parts 144_1 to 144_6 are arranged side by side along an outer periphery 136 of the substrate 130 (outer periphery 135a of a projecting part 135) in the predetermined region AR of the substrate 130. At this time, it is preferable to form the through hole parts 144_1 to 144_6 such that a magnetic detection element 122 is surrounded by an imaginary line Q connecting the through hole parts 144_1 to 144_6, in the predetermined region AR on the main surface 131.

More preferably, for example, as illustrated in FIG. 5A, in the predetermined region AR on the main surface 131, not only the magnetic detection element 122 but also wiring patterns 138_1, 138_2, and the like connected to the magnetic detection element 122 are formed so as to be surrounded from outside by the imaginary line Q connecting the through hole parts 144_1 to 144_6.

Thus, in the circuit board 12A according to Embodiment 2, the ground pattern 142A is formed on the back surface 132 of the substrate 130, the through holes 145 are formed between the outer periphery 136 of the substrate 130 in the predetermined region AR, and the magnetic detection element 122, the metal films 146 as metal members are formed on the inner wall surfaces of the substrate 130 defined by the through holes 145, and the metal films 146 and the ground pattern 142A are connected to each other.

According to this, similarly to the circuit board 12 according to Embodiment 1, in a case in which the charged body 60 such as a hand of a human approaches the projecting part 135 of the substrate 130 (predetermined region AR), or even in a case in which the charged body 60 contacts the projecting part 135, discharge occurs between the charged body 60 and the metal films 146 having lower impedance (resistance value) than the magnetic detection element 122, and therefore it is possible to prevent the electrostatic breakdown of the electronic component disposed on the projecting part 135 (predetermined region AR) such as the magnetic detection element 122.

Therefore, according to the circuit board 12A according to Embodiment 2, similarly to the circuit board 12 according to Embodiment 1, it is possible to improve the ESD strength of the motor drive control circuit while suppressing increase of the area of the circuit board.

In the predetermined region AR of the substrate 130, a plurality of the through hole parts 144 are arranged side by side along the outer periphery 136 of the substrate 130 (outer periphery 135a of the projecting part 135), so that the magnetic detection element 122 is surrounded from the outside by the plurality of through hole parts 144, and therefore it is possible to effectively prevent electrostatic breakdown of the magnetic detection element 122 or the like, and it is possible to improve ESD strength of the motor drive control circuit.

As illustrated in FIG. 6, in the circuit board 12A, the metal films 146 of the through hole parts 144 extend from the inner wall surfaces of the substrate 130 defined by the through holes 145 onto the main surface 131, and are formed so as to be exposed on the main surface 131.

According to this, even in a case in which the charged body 60 approaches (or contacts) from the main surface 131 side of the substrate 130, discharge is easily performed from the charged body 60 to the metal films 146, and it is possible to improve the ESD strength of the motor drive control circuit. Additionally, according to this, the through hole parts 144 can be formed by a similar manufacturing process to a via in a multilayer substrate.

Expansion of Embodiment

Thus, although the disclosure performed by the present inventors is specifically described on the basis of the embodiments, it goes without saying that the present disclosure is not limited to these, and various modifications can be made without departing from the scope and spirit of the present disclosure.

For example, although a case in which the outer shape of the substrate 130 is circular in plan view is exemplified in the above embodiments, the present disclosure is not limited to this. For example, a rectangular shape (for example, a square shape) or other shape may be used. Additionally, although a case in which the through-bore 133 formed in the substrate 130 is circular in plan view is exemplified, the present disclosure is not limited to this. For example, a rectangular shape (for example, a square shape) may be used.

Furthermore, the through-bore 133 may be formed at another position of the substrate 130 without being limited to the central portion of the substrate 130. Additionally, the through-bore 133 may not be formed in the substrate 130. In this case, in FIGS. 2A, 2B, the output shaft 18, the bearing 19, and the bearing housing 20 only needs to able to be mounted in a region corresponding to the through-bore 133.

Although a case in which the circuit board 12, 12A is a circuit board for a single-phase brushless motor is exemplified in each of the above embodiment, the present disclosure is not limited to this. For example, also in a circuit board for a brushless motor of a plurality of phases (for example, three phases), the guard pattern 141 or the through hole part 144 as a metal member may be formed similarly.

Although a case in which magnetic detection element 122 is a hall element is exemplified in each of the above embodiments, the magnetic detection element 122 may be a Hall IC including a hall element and other peripheral circuit.

Although a case in which the substrate 130 is a double-sided substrate is exemplified, the substrate 130 may be a multilayer substrate having a three or more wiring layers.

The configuration of the fan 1 is not limited to the configuration illustrated in FIG. 1. For example, if the circuit board 12, 12A is employed, and a function as a fan can be implemented, addition or change of components, or the like may be performed.

In each of the above embodiment, the shapes of the wiring patterns formed in the circuit board 12, 12A, or the shape of a package of the electronic components such as the IC 121 for motor drive control, and the like are not limited to the shape illustrated in FIGS. 2A, 2B, and the like. As long as the purpose can be attained, various shapes can be employed.

Although a case in which the electronic component disposed in the projecting part 135 is the magnetic detection element 122 is exemplified in each of the above embodiment, the electronic component other than the magnetic detection element 122 may be disposed on the projecting part 135. Similarly, it is possible to prevent electrostatic breakdown of the electronic component disposed on the projecting part 135.

In Embodiment 1, a case in which the two vias 143_1, 143_2 are formed in the substrate 130 is exemplified. However, the present disclosure is not limited to this, and three or more vias 143 may be formed.

Although in a case in which the metal films 146 extend from the inner wall surfaces of the substrate 130 defined by the through holes 145 onto the main surface 131 is exemplified In Embodiment 2, the present disclosure is not limited to this. For example, in a case in which required ESD strength is satisfied, the metal films 146 are formed only on the inner wall surfaces of the substrate 130 defined by the through holes 145, and may not be formed on the main surface 131. However, the metal films 146 need to be connected to the ground pattern 142A formed on the back surface 132.

What is claimed is:

1. A circuit board for a motor unit equipped with a motor comprising:
    a substrate having a main surface being one of a pair of surfaces opposed to each other, and a back surface being another of the pair of surfaces;
    a magnetic detection element disposed in a predetermined region on an outer periphery side of the substrate on the main surface, and configured to output a detection signal in accordance with a position of a rotor of the motor; and
    a metal member formed between the outer periphery of the substrate and the magnetic detection element in the predetermined region on the main surface, and configured to receive a supplied ground voltage, wherein the metal member includes a first wiring pattern made of metal formed along the outer periphery of the substrate in the predetermined region on the main surface,
    the circuit board further comprising:
    a second wiring pattern configured to receive the supplied ground voltage, and made of metal formed on the back surface;
    at least one via penetrating the main surface and the back surface, and connecting the first wiring pattern and the second wiring pattern; and
    a ground pattern configured to receive the supplied ground voltage, and made of metal formed on the main surface, wherein
    the first wiring pattern is belt-like,
    one end portion of the first wiring pattern is connected to the ground pattern, and
    at least the one via is formed on another end portion side of the first wiring pattern.

2. The circuit board according to claim 1, wherein no insulating film is formed on a surface of the first wiring pattern.

3. The circuit board according to claim 1, wherein the substrate has a main part, and a projecting part projecting outward from the main part, the predetermined region is a region including the projecting part on the main surface, and the metal member is disposed along an outer periphery of the projecting part.

4. A motor unit comprising:
the circuit board according claim 1;
the motor; and
an accommodating part having a cylindrical side wall part for accommodating the substrate, wherein
an outer periphery of the main part of the substrate is surrounded by the side wall part, and
at least a part of the outer periphery of the projecting part of the substrate is not surrounded by the side wall part.

5. A circuit board for a motor unit equipped with a motor comprising:
a substrate having a main surface being one of a pair of surfaces opposed to each other, and a back surface being another of the pair of surfaces;
a magnetic detection element disposed in a predetermined region on an outer periphery side of the substrate on the main surface, and configured to output a detection signal in accordance with a position of a rotor of the motor;
a metal member formed between the outer periphery of the substrate and the magnetic detection element in the predetermined region on the main surface, and configured to receive a supplied ground voltage; and
a ground pattern configured to receive the supplied ground voltage, and made of metal formed on the back surface, wherein
the metal member is a through hole part including a metal film formed on an inner wall surface of the substrate defined by a through hole penetrating the main surface and the back surface,
the metal film is connected to the ground pattern,
a plurality of the through hole parts are included, and
the plurality of the through hole parts are arranged side by side along the outer periphery of the substrate in the predetermined region.

6. The circuit board according to claim 5, wherein
the metal film extends from the inner wall surface of the substrate defined by the through hole onto the main surface.

* * * * *